Feb. 6, 1962    G. L. KITTERMAN    3,020,070
LOCKING STRUCTURE
Filed March 14, 1960
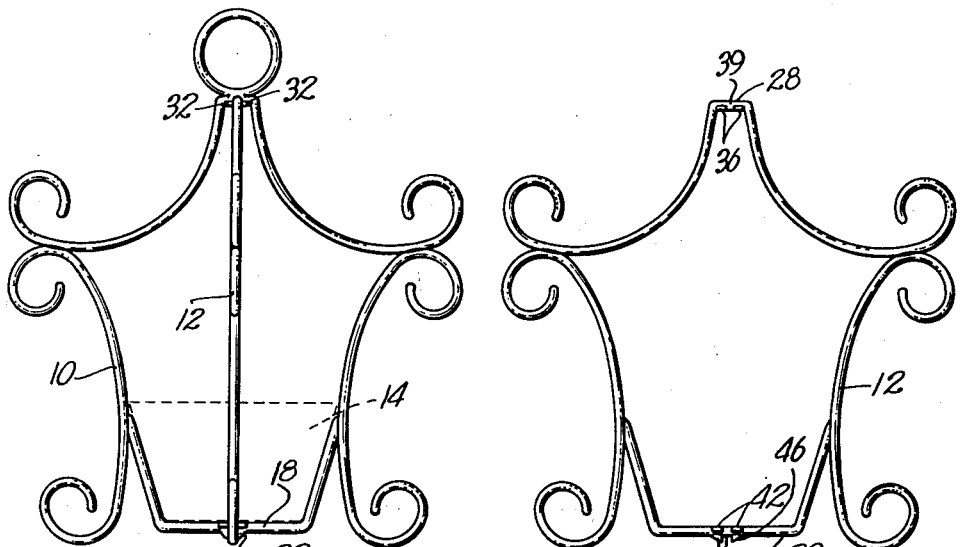
Fig.1.    Fig.2.
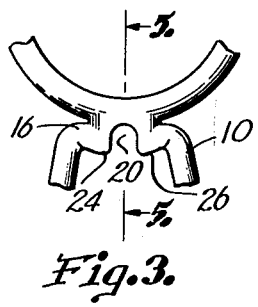    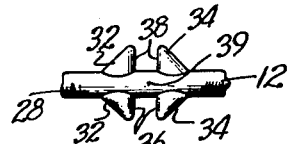
Fig.3.    Fig.6.
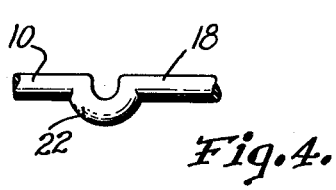    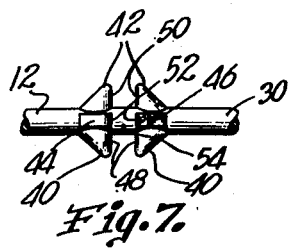
Fig.4.    Fig.7.
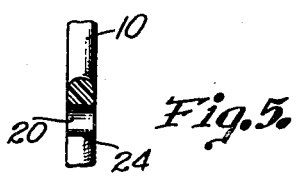
Fig.5.
INVENTOR.
Gary L. Kitterman
BY
Hovey, Schmidt, Johnson & Hovey
ATTORNEYS.

United States Patent Office 3,020,070
Patented Feb. 6, 1962

3,020,070
LOCKING STRUCTURE
Gary L. Kitterman, 1601 Washington Blvd.,
Kansas City, Kans.
Filed Mar. 14, 1960, Ser. No. 14,961
6 Claims. (Cl. 287—54)

This invention relates to locking structure and more particularly to locking means whereby a pair of members may be maintained in relative predetermined fixed positions with respect to one another.

It is the most important object of this invention to provide locking structure for maintaining two members in fixed positions, there being portions formed at adjacent parts of the members which are interengageable whereby to attain the above-mentioned result.

Another object of this invention is to provide locking structure for a pair of members wherein the first member has a pair of opposed stretches, one of the stretches having a notch formed therein and the other of the stretches having a loop formed therein, said notch and said loop receiving complementary portions of a second member.

A yet further aim of the invention is to provide locking structure for a pair of members, whereby to dispose the second member in a plane perpendicular to the first member, the second member having a portion thereof which seats within the notch of the first member, there being wings integral with the second member on each side of the portion thereof seated within the noch and said second member also having a pair of ears and lugs formed thereon adjacent a portion of the second member which is received by the loop of the first member, the ears and the lugs on the second member coperating with the wings to prevent lateral or twisting movement of the second member with respect to the first member.

Other objects of the present invention include details of construction of the members and locking means formed therein which will become apparent from the following specification and accompanying drawing wherein:

FIGURE 1 is a side elevational view of a decorative container holder showing the manner in which the present locking structure is employed to maintain a first and a second member in fixed position;

FIG. 2 is a front elevational view of the second member;

FIG. 3 is an enlarged fragmentary view of a portion of the first member showing the manner in which the notch for receiving the second member is formed therein;

FIG. 4 is an enlarged fragmentary view of a portion of the first member showing the manner in which the loop for receiving the second member is formed therein;

FIG. 5 is a sectional view taken on line 5—5 of FIG. 3;

FIG. 6 is a fragmentary plan view of a portion of the second member showing the manner in which the wings are formed thereon; and FIG. 7 is a fragmentary bottom plan view of a portion of the second member showing the manner in which the ears and lugs are formed thereon.

The locking structure hereinafter described may be used in many manners where it is desired to interlock a pair of continuous frame-like members in a predetermined fixed position with the members disposed in planes of different angularity. For purposes of illustration in the present case the locking structure has been shown as it might be used to interlock a pair of members forming the frame for a decorative container receiver. Thus, as best seen in FIG. 1, there is a first member 10 and a second member 12 which are interlocked in such a manner as to form a supporting framework for a container such as 14. Members 10 and 12 are interlocked at the opposed ends thereof and to achieve this result the continuous first member 10, which in the embodiment chosen for illustration comprises a cylindrical plastic member, has a pair of opposed stretches 16 and 18. Stretch 16 of member 10 has a notch 20 formed therewithin intermediate the ends of stretch 16 and stretch 18 has a loop 22 formed therewithin, notch 20 and loop 22 being in opposed alignment at the opposite ends of first member 10. Notch 20 formed in member 10 is substantially U-shaped as best seen in FIG. 3 and is adapted to receive therewithin a portion of the second member 12. The notch 10 also serves to form a pair of shoulders 24 and 26 and the stretch 16 of member 10 immediately adjacent notch 20 is flattened for reasons which will be hereinafter explained. Loop 22 which is formed in stretch 18 of member 10 is also, in the present form, substantially U-shaped whereby to receive a portion of second member 12 therewithin. It will be apparent that the configuration of both notch 20 and loop 22 may be altered within the scope of this invention to accommodate a second member of any cross-sectional configuration, the cylindrical configuration of the members shown being merely for purposes of illustration.

Second member 12 and the interlocking structure formed integrally therewith is best seen in FIGS. 2, 6 and 7 and it will be noted that said member 12 has at the opposite ends thereof normally horizontal sections 28 and 30 respectively. Section 28, as best seen in FIG. 6, has formed intermediate the ends thereof two pairs of outwardly extending wings 32 and 34 respectively. Wings 32 and 34 are formed integrally with member 12 and are substantially triangular in plan configuration whereby to present a pair of innermost opposed edges 36 and 38 on each side of member 12. There is sufficient space between edges 36 and 38 to allow shoulders 24 and 26 to be disposed therebetween when the portion 39 of member 12 between wings 32 and 34 is received within notch 20 of member 10.

Section 30 of member 12 also has locking structure formed integrally therewith, such structure being best shown by FIG. 7. As is apparent, there are a pair of outwardly extending ears 40 and 42 on each side of member 12, said ears lying in a plane substantially perpendicular to that of member 12. Also formed integrally with member 12 in a position substantially perpendicular to the plane of ears 40 and 42 are a pair of spaced-apart lugs 44 and 46 respectively. The innermost edges 48 and 50 of ears 40 and 42, respectively, are spaced apart, as are the innermost edges 52 of lugs 44 and 46, there being disposed between said innermost edges a portion 54 of member 12 adapted to be seated within loop 22.

With the construction above described first member 10 and second member 12 may be interlocked by the locking structure formed integrally therewith and above described in the following manner. Given first member 10, the second member 12 is most easily disposed relative thereto at the desired angularity by first inserting portion 54 of section 30 of member 12 within loop 22 whereby the lugs 44 and 46 may straddle that part of member 10 forming loop 22 and ears 40 and 42 have their innermost edges 48 and 50, respectively, in engagement with that portion of stretch 18 of member 10 immediately adjacent loop 22. This will serve to prevent movement of portion 54 from within the confines of loop 22 and will serve to seat said portion 54 snugly into loop 22 in all respects. When this has been accomplished portion 39 of section 28 of member 12 is snapped into notch 20 whereby the inner edges 36 and 38 of wings 32 and 34, respectively, will engage that portion of stretch 16 of member 10 immediately adjacent notch 20 which has been flattened whereby said portion 39 is tightly seated within notch 20. When assembled as above described it will be appreciated that lugs 44 and 46, ears 40 and 42 and wings 32 and 34 cooperate to maintain member 12 in its predetermined position with respect to member 10 and to prevent lateral or twisting movement of the members 10 and 12 one with respect to the other.

As above mentioned, the locking structure herein described may be used in many instances where it is desired to interlock two frame-like members such as 10 and 12 in predetermined positions relative to one another and the embodiment shown in the drawing is for purposes of illustration only and is not intended to limit the scope of the invention herein described.

Having thus described the invention what is claimed as new and desired to be secured by Letters Patent is:

1. Locking structure for maintaining a pair of members in relative fixed positions comprising a first member including a first stretch having a U-shaped notch formed therein and a second stretch spaced from said first stretch and having a U-shaped loop formed therein, the transverse cross section of each stretch being substantially uniform throughout the length thereof; and a second continuous member having a portion thereof seated within said notch and a section received by said loop, there being a pair of wings integral with said second member on each side of the portion thereof which is seated within said notch.

2. Locking structure as set forth in claim 1 wherein said wings engage said first member at areas adjacent said notch when said portion of the second member is seated within said notch whereby to prevent lateral movement of said second member with respect to said first member.

3. Locking structure for maintaining a pair of members in relative fixed positions comprising a first member including a first stretch having a U-shaped notch formed therein and a second stretch spaced from said first stretch and having a U-shaped loop formed therein, the transverse cross section of each stretch being substantially uniform throughout the length thereof; and a second continuous member having a portion thereof seated within said notch and a section received by said loop there being a pair of ears integral with said second member on each side of said section which is received by said loop.

4. Locking structure as set forth in claim 3 wherein said ears engage the first member at areas adjacent the open end of said loop when said section of the second member is received by said loop whereby to prevent lateral movement of said second member with respect to said first member.

5. Locking structure as set forth in claim 3 there being a pair of depending, spaced apart lugs integral with said second members, said loop being disposed therebetween when said section of the second member is received by said loop whereby to prevent lateral movement of said second member with respect to said first member.

6. Locking structure for maintaining a pair of members in relative fixed positions comprising a first member having a pair of opposed stretches, one of said stretches having a notch formed therein, the other of said stretches having a loop therein, the transverse cross section of each stretch being substantially uniform throughout the length thereof; and a second continuous member disposed in a plane perpendicular to the plane of said first member and between said stretches, said second member having a portion thereof seated within said notch, there being a pair of wings integral with said second member on each side of the portion thereof which is seated within said notch, said wings each having an edge in engagement with said first member at an area adjacent said notch, a section of said second member being received by said loop, there being a pair of ears integral with said second member on each side of the section which is received by said loop and in engagement with the first member at areas adjacent the open end of said loop and a pair of depending, spaced apart lugs integral with said second member, said loop being disposed therebetween said wings, ears and lugs cooperating to prevent lateral or twisting movement of said second member with respect to said first member.

References Cited in the file of this patent

UNITED STATES PATENTS

| | | |
|---|---|---|
| 1,429,198 | Fawcett | Sept. 12, 1922 |
| 1,980,131 | Flanagan | Nov. 6, 1934 |
| 2,604,288 | Koch | July 22, 1952 |